US008903317B2

(12) United States Patent
Wu

(10) Patent No.: US 8,903,317 B2
(45) Date of Patent: Dec. 2, 2014

(54) SYSTEM AND METHOD FOR CONTROLLING AN INFRARED CAMERA USING A MOBILE PHONE

(75) Inventor: Jiping Wu, Guangdong (CN)

(73) Assignee: Guangzhou SAT Infrared Technology Co. Ltd., Guangdong (CN)

( * ) Notice: Subject to any disclaimer, the term of this patent is extended or adjusted under 35 U.S.C. 154(b) by 294 days.

(21) Appl. No.: 13/596,955

(22) Filed: Aug. 28, 2012

(65) Prior Publication Data

US 2013/0072120 A1 Mar. 21, 2013

(30) Foreign Application Priority Data

Sep. 20, 2011 (CN) .......................... 2011 1 0287077

(51) Int. Cl.
*H04B 7/00* (2006.01)
*G08C 17/02* (2006.01)

(52) U.S. Cl.
CPC ............ *G08C 17/02* (2013.01); *G08C 2201/93* (2013.01); *G08C 2201/42* (2013.01)
USPC ........................... 455/41.2; 455/420; 348/143

(58) Field of Classification Search
CPC ............. H04R 2420/07; H04R 1/1016; H04R 2205/024; H04R 2420/05; H04B 1/202; H04B 1/205; H04H 40/36; H04H 60/58; H04M 1/6041; H04M 1/6058; H04M 1/6066
USPC .............. 340/521, 525, 539.13, 573.3, 573.4; 348/14.02, 14.08, 143, 144, 148, 158, 348/164, 222.1; 455/411, 418, 456.1, 455/456.3, 466, 556.1, 90.1
See application file for complete search history.

(56) References Cited

U.S. PATENT DOCUMENTS

| | | | | |
|---|---|---|---|---|
| 6,385,772 | B1 | 5/2002 | Courtney | |
| 7,391,298 | B1 | 6/2008 | Campbell et al. | |
| 2006/0249678 | A1 | 11/2006 | Wu et al. | |
| 2007/0177016 | A1 | 8/2007 | Wu | |
| 2008/0077020 | A1 | 3/2008 | Young et al. | |
| 2008/0092610 | A1 | 4/2008 | Kuo et al. | |
| 2010/0118748 | A1* | 5/2010 | Pratt et al. | 370/310 |
| 2010/0214398 | A1* | 8/2010 | Goulart et al. | 348/61 |
| 2011/0109740 | A1* | 5/2011 | Guha et al. | 348/143 |
| 2011/0169961 | A1 | 7/2011 | Wu | |
| 2011/0309921 | A1* | 12/2011 | Tachibana | 340/425.1 |
| 2012/0057027 | A1 | 3/2012 | Wu | |

FOREIGN PATENT DOCUMENTS

| | | | |
|---|---|---|---|
| CN | 2798444 | Y | 7/2006 |
| CN | 200973129 | Y | 11/2007 |
| JP | 2004012454 | | 1/2001 |
| JP | 2005519280 | | 6/2005 |
| JP | 2011106904 | | 2/2011 |

* cited by examiner

*Primary Examiner* — Golam Sorowar
(74) *Attorney, Agent, or Firm* — Stoel Rives LLP

(57) ABSTRACT

The present application provides a system and method for controlling an infrared camera by using a mobile phone. The system includes a client and an infrared camera used as a server and connected to the client through a communication network. The infrared camera is mounted in a location to perform infrared measuring and/or monitoring, so as to provide infrared image videos of a monitored object and temperature data of the points contained in an infrared image. The client is mounted in a position far away from the location of the infrared camera to provide a remote control for the infrared camera. The present application allows monitoring personnel or a user to remotely monitor and control an infrared camera by using a mobile phone.

4 Claims, 3 Drawing Sheets

SYSTEM AND METHOD FOR CONTROLLING AN INFRARED CAMERA USING A MOBILE PHONE

RELATED APPLICATION

The present application claims the benefit of foreign priority under 35 U.S.C. 119 based upon Chinese Application 201110287077.8 filed on Sep. 20, 2011, the whole of which is hereby incorporated by reference herein.

TECHNICAL FIELD

The present application relates to the technical fields of infrared camera applications, and more particularly relates to a system and method for controlling an infrared camera by using a mobile phone.

BACKGROUND

Infrared cameras, on the benefit of their powerful functions of infrared imaging and temperature measuring, have been more and more widely used in the fields of industry or civil production, configuration and detection. Infrared cameras may capture infrared images of objects, measure and check positions and working status of objects and so on, based on the infrared detection technologies, and can obtain infrared analog signals and infrared digital signals related to structures, actions and status of the captured objects therefrom.

In the usage of infrared cameras for testing or monitoring, it is usually needed for specially trained persons to perform on-site monitoring or controlling operations. However, in some locations, it is not suitable for human beings to perform direct on-site monitoring or controlling operations on infrared cameras. For example, in some product manufacturing factories or laboratories, sometimes extremely harsh environmental conditions are encountered. Some places where infrared cameras are needed may have too high or too low temperatures, and some even have high strength radiations or pollutions in local areas or during certain time periods, all of which belonging to situations where it may not be suitable for human beings to step in or stay for long periods of time. Further, in other places where infrared cameras are to be mounted too high or too low, it is not convenient for a user to enter into the work position or perform actions therein. In addition, in some situations of civil or business applications, infrared cameras are often mounted in places to perform environment or facility monitoring operations over a long time period, where the user cannot stay all the time. Once there is an anomaly or an emergency occurring and the user just happens not to be there, it is very easy to cause extremely serious consequences for not being able to promptly report or to handle the abnormal situation.

SUMMARY

In order to overcome the deficiencies of the prior art, certain embodiments of the present application provide a system and method for controlling an infrared camera by using a mobile phone, which allows a monitoring personnel or a user to remotely monitor or control an infrared camera using a mobile phone.

Further, certain embodiments of the present disclosure also allow a user of the mobile phone configured as a client to browse the images coming from a server (i.e., the infrared camera) on the screen of the mobile phone at any time, to apply analysis and treatments thereon if necessary, and to enable the mobile phone to share the sound signals with the infrared camera, such that the user can understand the on-site situations and handle the abnormal failures in real-time even though the user is not there.

In order to achieve certain objects of the present application, certain embodiments of the present application provide a system for controlling an infrared camera using a mobile phone, which comprises: a client; and an infrared camera used as a server and connected to the client through a communication network, wherein the infrared camera is mounted in a location in need of infrared measuring and/or monitoring, so as to provide infrared image videos of a monitored object and temperature data of the points contained in an infrared image, wherein the client is mounted in a position far away from the location of the infrared camera to provide a remote control for the infrared camera.

According to certain embodiments of the present application, wherein the client is a mobile phone, the remote control for the infrared camera comprises: controlling movement orientations, oblique angles, rotation angles and image capture actions of a camera head in the infrared camera; intercepting and transmitting the infrared image videos captured by the infrared camera, and displaying the obtained results on the mobile phone screen; and transmitting the sound information coming from the mobile phone to the infrared camera to record and/or play, and transmitting the sound information coming from the infrared camera to the mobile phone to record and/or play.

According to certain embodiments of the present application, the mobile phone comprises: a keyboard for generating and transmitting control commands; an image analysis and treatment module for receiving infrared image data signals sent from the infrared camera, and extracting temperature information and forming an image browser; a sound record and play module for sending real-time sound data generated by the mobile phone or stored sound data to the infrared camera, and receiving, recording and/or playing sound data coming from the infrared camera; a mobile phone communication interface connected respectively with the keyboard, the image analysis and treatment module and the sound record and play module, wherein the mobile phone communication interface is used for transmitting and receiving signals coming from and/or going to the infrared camera, and the signals comprise control command signals, sound data signals and image data signals; and a display screen for displaying image and data information generated by the image analysis and treatment module.

According to certain embodiments of the present application, the infrared camera comprises a built-in platform and a camera, and the built-in platform has parts set thereon including: a control module for receiving and identifying control commands coming from the mobile phone and for transforming the control commands into operation commands respectively corresponding to action controlling, image intercepting, and sound recording and playing; an image interception and buffer module for intercepting, buffering and transmitting infrared image videos captured by the camera; a sound reading and writing module for receiving and recording sound data coming from the mobile phone, and transmitting the sound data generated by the infrared camera to the mobile phone; and a camera communication interface for transmitting and receiving signals coming from and/or going to the mobile phone, wherein the signals comprise the control command signals, the sound data signals and the image data signals.

In order to achieve certain objects of the present application, certain embodiments of the present application also provide a method for controlling an infrared camera using a mobile phone, which comprises steps of: providing a remote control for the infrared camera by using a client far away from the infrared camera; and providing infrared image videos of a monitored object and temperature data of the points contained in an infrared image by an infrared camera mounted in a location needs to perform infrared measuring and/or monitoring.

According to certain embodiments of the present application, wherein the client is a mobile phone, the remote control for the infrared camera comprises steps of: controlling movement orientations, oblique angles and rotation angles, and image capture actions of a camera head in the infrared camera; intercepting, buffering, analyzing and transmitting the infrared image videos captured by the infrared camera, and displaying the obtained results on a display screen of the mobile phone; and transmitting sound information coming from the mobile phone to the infrared camera to record and/or play, and transmitting sound information coming from the infrared camera to the mobile phone to record and/or play.

According to certain embodiments of the present application, the remote control also comprises a step of: realizing communication of signals between the mobile phone and the infrared camera through a mobile phone communication interface and a camera communication interface respectively set on the mobile phone and the infrared camera, wherein the signals comprise control command signals, sound data signals and image data signals to be transmitted therebetween.

According to certain embodiments of the present application, the mobile phone communication interface and the camera communication interface carry out wireless communication therebetween under the Bluetooth communication protocols.

According to certain embodiments of the present application, the mobile phone communication interface and the camera communication interface communicate with each other under the WiFi-based LAN communication protocols, wherein the mobile phone and the infrared camera are all connected to the internet by way of AP; or the mobile phone is connected to the network by way of AP, and the infrared camera is directly connected to the network via its network data interface.

According to certain embodiments of the present application, the mobile phone communication interface and the camera communication interface carry out wireless communication therebetween under the WiFi-based ad-hoc network communication protocols.

The present application, according to certain embodiments, may realize data communication between the infrared camera for monitoring and the mobile phone carried by a user by performing a series of hardware and software improvements thereon. Accordingly, when a location of the infrared camera for monitoring is not suitable for human beings to step in or stay long, the user may stay out in a different place and perform a remote control on the infrared camera by using a mobile phone.

While in controlling the built-in platform of the infrared camera and the various actions of the camera, the user may also allow the mobile phone and the infrared camera to share sound and image signals therebetween by way of Bluetooth or WiFi communication, so as to intercept and play images and temperature data coming from the infrared camera on the display screen of the mobile phone, or allow the infrared camera and the mobile phone to bidirectionally communicate and share sound signals therebetween, thus providing great convenience for the user whom is absent from the location to control and handle the on-site situation in real-time.

Figure 1:
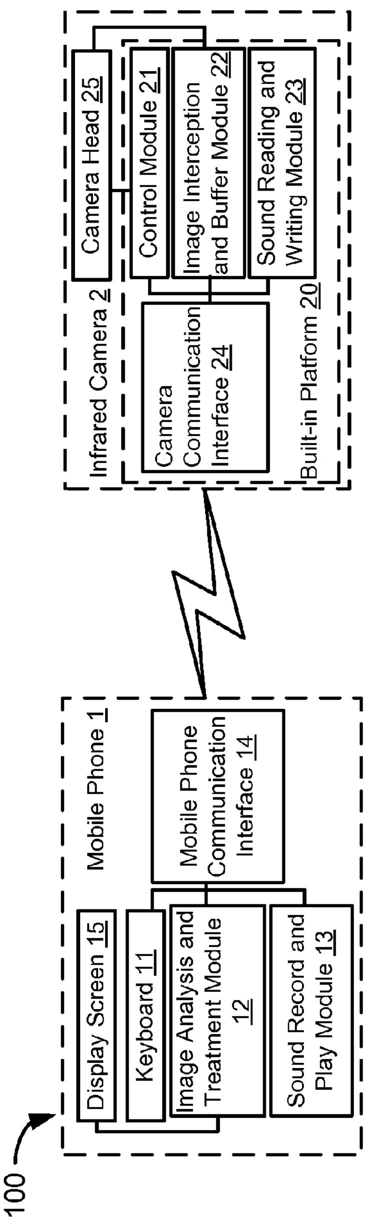
FIG. 1 is a block diagram showing a system for controlling an infrared camera by using a mobile phone according to an embodiment of the present application.

Wherein reference signs are explained as below:

100—system
1—mobile phone
  11—keyboard
  12—image analysis and treatment module
  13—sound record and play module
  14—mobile phone communication interface
  15—display screen
2—infrared camera
  20—built-in platform
  21—control module
  22—image interception and buffer module
  23—sound reading and writing module
  24—camera communication interface
  25—camera head

DETAILED DESCRIPTION OF PREFERRED EMBODIMENTS

The foregoing and other objects, aspects and advantages of the present application will become more apparent from the following detailed description of the embodiments in the present application taken in conjunction with the preferred embodiments and accompanying drawings. The embodiments here are only used to illustrate but not to limit the present application.

A system for controlling an infrared camera by using a mobile phone according to an embodiment of the present application includes a client and a server. The client, for example, may be a mobile phone and the server, for example, may be an infrared camera. In an embodiment of the present application, the mobile phone may be a generally used Android mobile phone with a client software, such as application (or "App") developed based on the Android system, and the function of which is accomplished by using the WiFi and Bluetooth hardware module on the Android mobile phone. The type of the mobile phone, for example, may be HTC G6 manufacture by HTC Corporation, and the infrared camera, for example, may be a built-in VS640 infrared camera newly-developed by Guangzhou SAT Infrared Technology Co. Ltd., but the present application is not limited thereto. The mobile phone and the infrared camera are properly configured and packaged to communicate with each other. That is, the present system, according to certain embodiments, has an application approach of: the client software uses two-way communication of the WiFi or Bluetooth module in an Android system of the mobile phone to communicate with the WiFi or Bluetooth module in the infrared camera.

In order to realize compatibility and real-time signal communication between the mobile phone and the infrared camera, the present application, according to certain embodiments, provides a series of hardware modifications and software developments for the mobile phone and the infrared camera, respectively, and finally obtains a relatively ideal technical solution allowing a monitoring personnel (user) to remotely monitor and control the infrared camera.

Table 1 shows an example of the present application with its software development environment and the hardware and software operation environments respectively adopted by the client and the server.

TABLE 1

| the hardware and software developments and operation environments | |
|---|---|
| 1. Development Environments | |
| Operating systems: Windows XP, Linux 2.6.28, Android 2.2 OS<br>Development Tools: MyEclipse8.5, Cygwin, Xcode,, Interface Builder, Virtual machine<br>Development toolkit: Android SDK 2.2, Android NDK R5 | |
| 2. Operation Environments | |
| 1) Server | 2) Client |
| Hardware: S3C6410 built-in platform and camera<br>Software: Linux operating system | Hardware: HTC G6;<br>Software: Android 2.2 OS |

Wherein the infrared camera is mounted as a client in a location to perform infrared measuring and/or monitoring, providing infrared image videos of the monitored object and temperature data of the points contained in the infrared image. The mobile phone is carried by the user and is used as a client far away from the location of the infrared camera, providing a remote control for the infrared camera. The remote control includes: controlling moving orientations, oblique angles and rotation angles, and image capture actions of a camera head in the infrared camera; performing interception, analysis and transmission operations on the infrared image videos captured by the infrared camera, and displaying images on the display screen of the mobile phone; transmitting sound information coming from the mobile phone to the infrared camera so as to recorded and/or play, and transmitting sound information coming from the infrared camera to the mobile phone to record and/or play.

FIG. 1 is a block diagram showing the structure of the system 100 for controlling an infrared camera by using a mobile phone according to an embodiment of the present application. A mobile phone 1 of the system 100 includes: a keyboard 11 for generating and transmitting control commands; an image analysis and treatment module 12 for receiving infrared image data signals sent from an infrared camera 2, extracting temperature information and forming image browsers, and displaying images on the display screen of the mobile phone; a sound record and play module 13 for generating real-time sound data and transmitting the generated or recorded sound data to the infrared camera, and receiving, recording and/or playing sound data coming from the infrared camera; a mobile phone communication interface 14 for transmitting and receiving signals coming from and/or going to the infrared camera, wherein the signals include the control command signals, the sound data signals and the image data signals; and a display screen 15 for intuitively displaying image and data information generated by the image analysis and treatment module 12.

The infrared camera 2 includes a built-in platform 20 and a camera head 25. The built-in platform 20 has parts set thereon including: a control module 21 for receiving and identifying the control commands coming from the mobile phone and transforming the control commands into operation commands respectively corresponding to the action controlling, image intercepting, and sound recording and playing; an image interception and buffer module 22 (briefly, for example, which has the capture functions of the VS640 infrared camera), for intercepting, buffering and transmitting infrared image videos captured by the infrared camera; a sound reading and writing module 23 for receiving and recording sound data coming from the mobile phone 1, and transmitting sound data generated from the infrared camera 2 to the mobile phone 1; and a camera communication interface 24 for transmitting and receiving signals coming from and/or going to the mobile phone 1. The signals include control command signals, sound data signals and image data signals.

The infrared images are stored in the image interception and buffer module 22 of the server in JPEG format that follows the JPEG standards, and have certain infrared temperature measuring data to be contained therein. The analysis on the images in the image analysis and treatment module 12 of the client is to analyze the infrared data of the JPEG image captured by the infrared camera. After being received by the image interception and buffer module 22 of the server and by the image analysis and treatment module 12 of the client, the JPEG images are analyzed in an infrared range according to a model of temperature measuring and calculating corresponding to the above described infrared temperature measuring data, so as to read the temperature measuring data therein to perform temperature measuring.

The mobile phone communication interface 14 uses a WiFi or Bluetooth transmission medium to perform different data transmissions that are packaged under the TCP or Bluetooth protocols. The data transmissions may include a process of: 1. the mobile phone 1 of the client receives the user's input; 2. the input (i.e., touch events or key-press events) is analyzed; 3. transmission data are packaged according to different events; 4. the mobile phone communication interface 14 transmits data by selecting WiFi or Bluetooth communication according to a current environment; 5. the camera communication interface 24 in the VS640 infrared camera 2 of the server analyzes the data after receiving a request from the mobile phone 1; 6. the server performs different operations according to different commands; 7. the server packages and sends back the data after processing; 8. the data is sent again by the camera communication interface 24 through WiFi or Bluetooth communication to the mobile phone communication interface 14 in the mobile phone 1 of the client.

The mobile phone 1 and the infrared camera 2 have software systems including portions described below.

1) A keyboard remote control software system, which includes: a keyboard operation software installed in the mobile phone 1; and a keyboard response software installed in the infrared camera 2. When the user issues various control commands by pressing the keys on the mobile phone 1 according to actual requirements, the keyboard operation software installed therein may generate client instructions by sensing the key actions, analyzing and calling a script (briefly, which is a key-press processing program) corresponding to the key actions, and transmit remotely the client instructions to the infrared camera 2 through a communication interface. When receiving the client instructions, the infrared camera 2 identifies them by using the keyboard response software, and calls a script (which is similarly a key-press processing program) corresponding to the client instructions to perform corresponding actions, so as to realize the remote control on various actions of the mobile phone 1 applied on the built-in platform 20 and the camera head 25 of the infrared camera 2.

2) An interception browse and analysis software system, which includes: an interception buffer software installed on the image interception and buffer module 22 of the infrared camera 2, and a analysis browse software installed on the image analysis and treatment module 12 of the mobile phone 1. The infrared camera 2 intercepts and buffers the infrared videos captured by the camera head 25 currently or previously according to actual requirements, and transmits remotely the intercepted image data to the mobile phone 1 through a communication interface; after receiving the image data, the mobile phone 1 performs necessary analysis and treatment by using the analysis browse software installed therein, and then browses the obtained information of graphs or data on the mobile phone display screen 15. The analysis and treatment includes: extracting temperature information; forming and displaying various images; judging if there is any abnormal condition occurring; and reporting an alarm or performing other treatment when an abnormal condition occurs.

3) A sound treatment software system, which includes: a sound record and play software installed in the mobile phone 1; and a sound reading and writing software installed in the infrared camera 2. Both of these software may have functions of recording, playing, reading and writing, only that they are to be used in different places and in different ways. Usually, the mobile phone 1 and the infrared camera 2 each have functions of sound recording, storing and playing, but have no ability of sound signal communication therebetween. In actual applications, based on particular scenes (i.e., work sites) and work requirements, the sound information recorded in the mobile phone 1 may need to be transmitted to the infrared camera 2 so as to play on-site, or the sound information recorded in the infrared camera 2 may need to be transferred to the mobile phone 1 to facilitate the user's listening or backup. Therefore, the present application may bidirectionally transmit and share the sound signals between the mobile phone 1 and the infrared camera 2 by using the above described sound treatment software.

In other words, the software systems on the mobile phone 1 and the infrared camera 2 include a client software and a server software, the software set on the mobile phone 1 belongs to the client software, and the software set on the camera 2 belongs to the server software.

Figure 2:
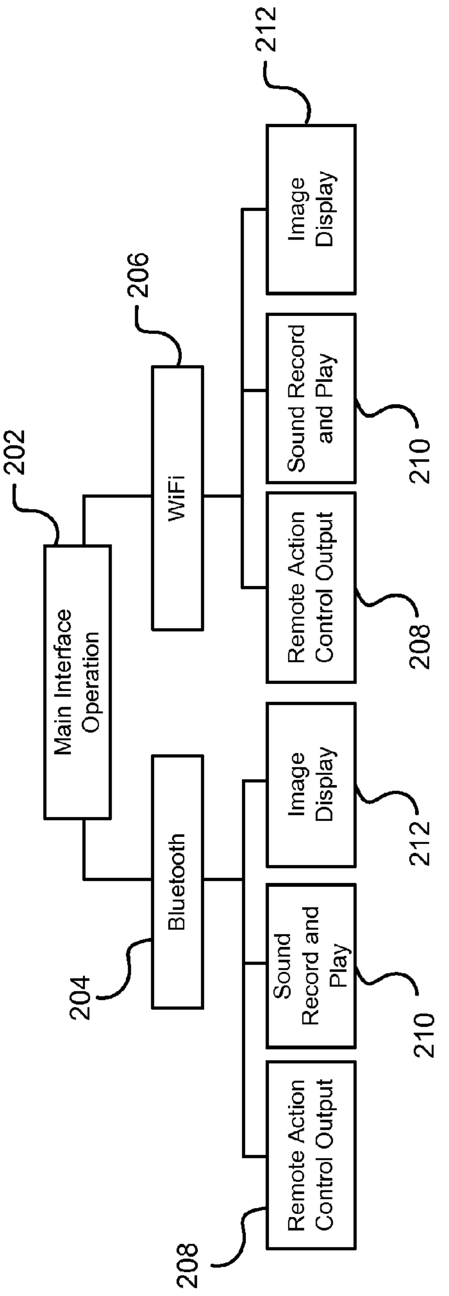
FIG. 2 is a block diagram showing functions of the mobile phone according to an embodiment of the present application.
Figure 3:
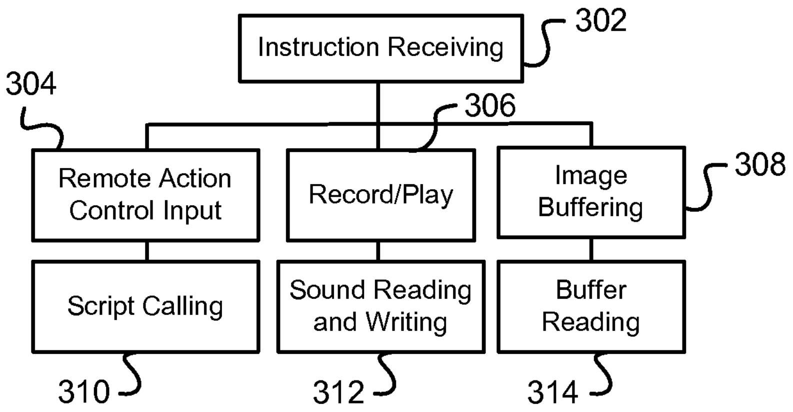
FIG. 3 is a block diagram showing functions of the infrared camera head according to an embodiment of the present application.

FIG. 2 and FIG. 3 are respectively block diagrams showing the functions of the mobile phone 1 and the infrared camera 2 after installing the hardware and software according to certain embodiments.

FIG. 2 is a block diagram showing the functions of the mobile phone 1 according to certain embodiments. After finishing main interface operations 202 such as a keyboard input or a screen input, the mobile phone 1 uses a Bluetooth module 204 and/or WiFi module 206 for communication, such as for remote action control output 208, image display 212, and sound record and play 210 functions. The two groups of functions respectively corresponding to the Bluetooth module 204 and the WiFi module 206 may be used in common. However, the Bluetooth and WiFi functions are identified separately here because they may have different subsequent applications. For example, the WiFi module 206 can support large amounts of data transmission such as videos, while the Bluetooth module 204 can only support small amounts of data transmission such as single-frame figures or images.

FIG. 3 is a block diagram showing functions of the infrared camera 2 according to certain embodiments. After receiving 302 control commands coming from the mobile phone 1, next level options such as input of remote action control 304, image buffering 308, and sound signal record/play 306 are selected and entered, according to the specific contents of the commands, together with their respectively corresponding operations such as script calling 310, buffer reading 314, and sound reading and writing 312, so as to realize the remote control on the capture actions of the camera head in the infrared camera 2, and to realize the transmission and treatment on videos and/or image signals and sound signals.

According to an embodiment of the present application, in the system for controlling an infrared camera by using a mobile phone in the present application, which has a configuration described as above, the data transmitted from the mobile phone 1 of the client to the infrared camera 2 of the server may include audio data for requesting recording, and may also include one or more control commands 1.1, 1.2, 1.3, 1.3.1, 1.3.2, 1.3.2.1, 1.3.3, 1.4, 1.5, 1.5.1, 1.5.2, 1.5.2.1, 1.5.2.2, 1.5.2.3, and 1.5.2.4, as described below.

1.1 Basic controlling commands—which for example include commands such as for keyboard controlling, voice recording and playing, and interception and touch controlling.

1.2 Catalog transmission (update) commands—the catalog contents are transmitted from the infrared camera 2 to the mobile phone 1, wherein the catalog contents include video data documents and audio data documents recorded or stored in the infrared camera 2.

1.3 Sound recording and playing commands:

1.3.1 recording requests—certain audio data documents are transmitted from the mobile phone 1 to the infrared camera 2, the latter thereby performs recording, storing and playing, or an environment background sound is recorded by the infrared camera 2 in a certain time period while being controlled by the mobile phone 1;

1.3.2 broadcasting requests:

1.3.2.1 broadcasting with a document of a specified name—a name of a certain document stored in the infrared camera 2 is specified by the mobile phone 1, and the corresponding audio data are played by the infrared camera 2 or transmitted from the infrared camera 2 to the mobile phone 1 to play;

1.3.3 deleting the specified audio document—a command to delete a certain document stored in the infrared camera 2 is sent by the mobile phone 1.

1.4 Camera interception commands—a command to transmit the corresponding video data from the infrared camera 2 to the mobile phone 1 is sent by the mobile phone 1.

1.5 Desktop commands:

1.5.1 desktop interception commands—a command to transmit the desktop interception data from the infrared camera 2 to the mobile phone 1 is sent by the mobile phone 1;

1.5.2 desktop operation commands—a command to apply operations as below on the desktop of the infrared camera 2 is sent by the mobile phone 1:

1.5.2.1 single click;

1.5.2.2 double click;

1.5.2.3 long press; and 1.5.2.4 move.

The data returned from the server may include: a camera head interception data, audio documents data requested to play, desktop interception data and catalog contents.

Figure 5:
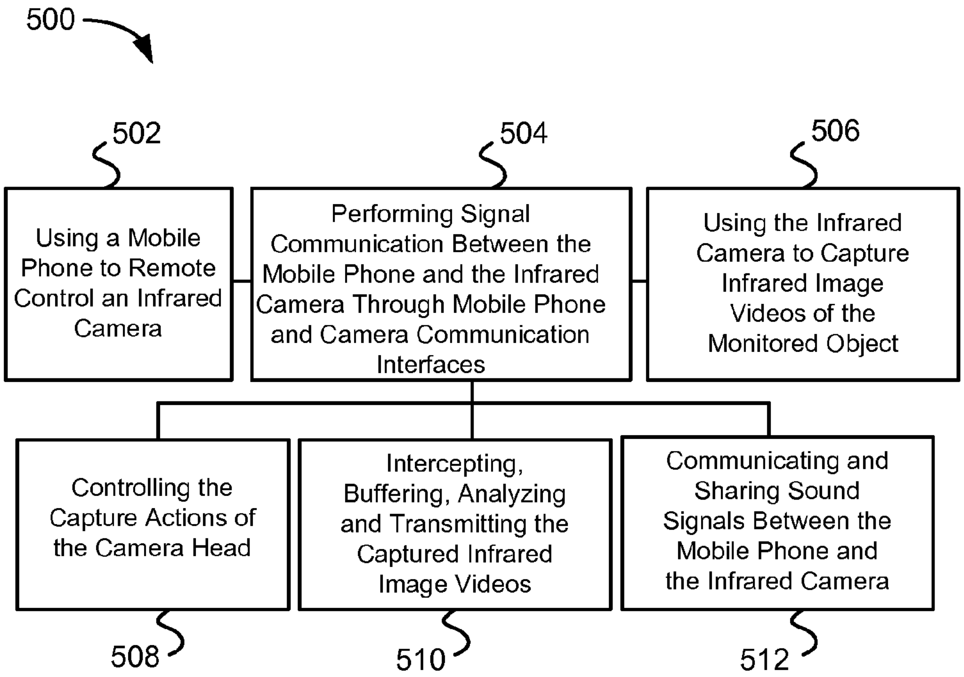
FIG. 5 is a flow chart showing a method for controlling an infrared camera using a mobile phone according to an embodiment of the present application.

FIG. 5 is a flow chart showing a method 500 for controlling an infrared camera by using a mobile phone according to certain embodiments of the present application.

As shown in FIG. 5, according to certain embodiments of the present application, the method 500 for using a mobile phone 1 to remote control an infrared camera 2 may include using 502 the mobile phone 1 to remote control an infrared camera 2 by using a client far away from the infrared camera 2. The client is the mobile phone 1. The method 500 further includes using 506 the infrared camera to capture infrared image videos of a monitored object and providing temperature data of the points contained in an infrared image by the infrared camera 2 mounted in a location needs to perform infrared measuring and/or monitoring. The method 500 also includes performing 504 signal communication between the mobile phone 1 and the infrared camera 2 through mobile phone and camera communication interfaces.

The remote control for the infrared camera 2 by the mobile phone 1 may include the steps of:

S1) controlling 508 the image capture actions of a camera head in the infrared camera 2 and/or controlling movement orientations, oblique angles and rotation angles of the camera head in the infrared camera 2;

S2) intercepting 510, analyzing and transmitting infrared image videos captured by the infrared camera 2, and displaying the obtained results on the display screen 15 of the mobile phone 1; and S3) communicating 512 and sharing sound signals between the mobile phone 1 and the infrared camera 2, which may include transmitting sound information coming from the mobile phone 1 to the infrared camera so as to record and/or play, and/or transmitting sound information coming from the infrared camera 2 to the mobile phone to record and/or play.

The remote control may also include:

S4) realizing signal communication between the mobile phone 1 and the infrared camera 2 through a mobile phone communication interface 14 and a camera communication interface 24 respectively set on the mobile phone 1 and the infrared camera 2, wherein the signals include control command signals, sound data signals and image data signals to be transmitted there between.

It may be noted that, the first three steps S1-S3 are performed with random sequences, and in a certain time period, a certain one of the three steps S1-S3 may be selected according to actual applications and working status at that time. When performing the three steps S1-S3, the transmission of various signals generated by the mobile phone 1 and the infrared camera 2 respectively are accomplished between the mobile phone 1 and the infrared camera 2 by step S4.

Figure 4A:
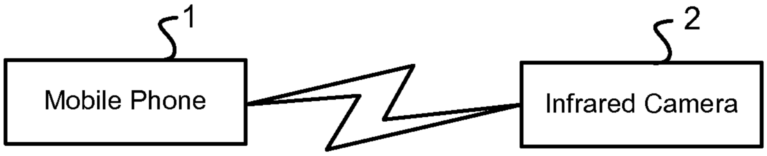
FIG. 4A, FIG. 4B, and FIG. 4C are schematic views showing a way of connection and communication between the mobile phone and the infrared camera head according to an embodiment of the present application.

According to certain embodiments of the present application shown in FIG. 4A, which shows a peer-to-peer communication of the present application based on a Bluetooth channel. The mobile phone communication interface 14 and the camera communication interface 24 may carry out wireless communication under the Bluetooth communication protocols and via the Bluetooth channel. In this example, the effective distance of the remote control from the mobile phone 1 to the infrared camera 2 is usually within a range between about 0 meters and about 15 meters.

Figure 4B:
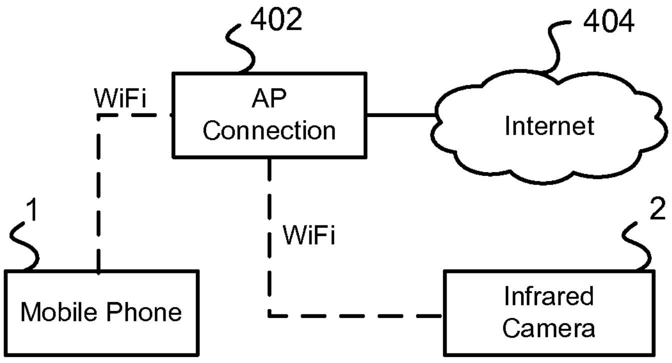
Figure 4C:
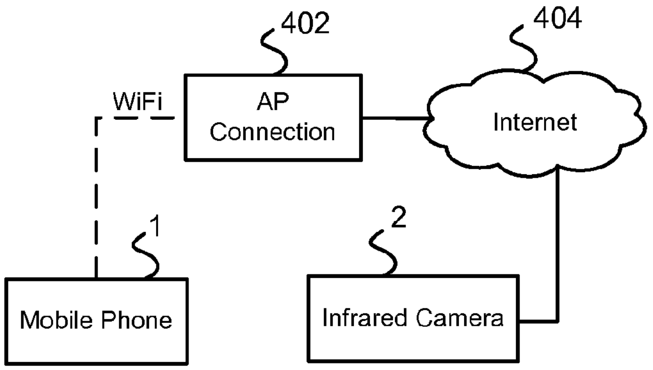

According to certain embodiments of the present application shown in FIG. 4B and FIG. 4C, a WiFi-based LAN communication of the present application is shown herewith. The mobile phone communication interface 14 and the camera communication interface 24 may communicate with each other under the WiFi-based LAN communication protocols, wherein the mobile phone 1 and/or the infrared camera 2 are each connected to a network (e.g., the internet 404) by way of a wireless access point (AP) connection 402 (FIG. 4B). Or the mobile phone 1 is connected to the network (e.g., the internet 404) by way of the wireless AP connection 402, and the infrared camera 2 is directly connected to the network (e.g., the internet 404) via its network data interface (which may use any known interface in the prior art), as shown in FIG. 4C. In this example, the effective distance of the remote control from the mobile phone 1 to the infrared camera 2 is usually within a range of about 32 meters to about 95 meters.

The mobile phone communication interface 14 and the camera communication interface 24 in the present application may perform wireless communication with each other under the WiFi-based ad-hoc network communication protocols by using an ad-hoc channel. In such an embodiment, the effective distance of the remote control from the mobile phone 1 to the infrared camera 2 is usually within a range of about 32 meters to about 95 meters. Since they are the same way of wireless communication, FIG. 4A is also used to show another embodiment of the WiFi-based ad-hoc communication in the present application.

According to the embodiments of the present application, and by way of example only, the mobile phone communication interface 14 and the camera communication interface 24 in the present application may respectively be selected from the interfaces as below:

A. Bluetooth interfaces:

1) on the platform of Android 2.2:

a) using Bluetooth classes and interfaces of Android software development kit (SDK) to perform remote control functions such as camera operating;

b) using sound-related classes and interfaces provided by Android SDK to perform sound recording and playing functions; and c) using Bluetooth socket of Android to perform image data transmitting and receiving, and image previewing.

B. WiFi interfaces:

1) WiFi interfaces in a way of peer-to-peer or AP selected as needed; and 2) on the platform of Android 2.2:

a) using WiFi classes and interfaces of Android SDK to perform remote control functions such as camera operating;

b) using sound-related classes and interfaces provided by Android SDK to perform sound recording and playing functions; and c) using Android platform network programs to perform image data transmitting and receiving, and image previewing.

The interfaces of the mobile phone 1 and the infrared camera 2 in the present application may, for example, satisfy the following requirements: being able to proceed hierarchical designs (as shown in FIG. 2 and FIG. 3); providing communication interface options on the main interface of the mobile phone and the infrared camera: "Bluetooth " or "WiFi"; rewriting the classes of Android SDK as needed, and embellishing the interfaces; automatically identifying keyboard display figures of the mobile phones handling different resolutions; providing friendly prompt boxes; providing freely interface jumping; and providing special interface effects.

The present application provides a series of hardware and software modifications to the infrared camera for monitoring and the mobile phone always carried by a user to accomplish data communication therebetween. Therefore, when a location of the infrared camera for monitoring is not suitable for human beings to step in or stay long, the user may stay in a different place and perform a remote control for the infrared camera by using the mobile phone.

While in controlling the built-in platform of the infrared camera and the various actions of the camera, the user may also let the mobile phone and the infrared camera to communicate or share sound and image signals therebetween in a way of Bluetooth or WiFi communication, so as to intercept image figures, process temperature data and play sound signals coming from the infrared camera on the mobile phone, or record and play sound signals coming from the mobile phone on the infrared camera, thus providing great convenience for the user whom is absent from the location to control and handle the on-site situation in real-time.

It will be understood by those having skill in the art that many changes may be made to the details of the above-described embodiments without departing from the underlying principles of the invention. The scope of the present invention should, therefore, be determined only by the following claims

The invention claimed is:

1. A system for controlling an infrared camera using a mobile phone, the system comprising:
- a client; and
- an infrared camera used as a server and connected to the client through a communication network, wherein the infrared camera is mounted in a location where infrared measuring and/or monitoring is performed, so as to provide infrared image videos of a monitored object and temperature data of the points contained in an infrared image,
- wherein the client is located remotely from the location of the infrared camera to provide a remote control for the infrared camera,
- wherein the client is the mobile phone comprising a display screen, and the remote control for the infrared camera comprises:
  - controlling movement orientations, oblique angles, rotation angles and image capture actions of a camera head in the infrared camera;
  - intercepting and transmitting the infrared image videos captured by the infrared camera, and displaying an obtained result on the display screen of the mobile phone; and
  - transmitting a sound information coming from the mobile phone to the infrared camera to record and/or play, and transmitting the sound information coming from the infrared camera to the mobile phone to record and/or play,
- wherein the mobile phone comprises:
  - a keyboard for generating and transmitting control commands;
  - an image analysis and treatment module for receiving infrared image data signals sent from the infrared camera, and extracting temperature information and forming an image browser;
  - a sound record and play module for sending real-time sound data generated by the mobile phone or stored sound data to the infrared camera, and receiving, recording and/or playing sound data coming from the infrared camera; and
  - a mobile phone communication interface connected respectively with the keyboard, the image analysis and treatment module and the sound record and play module, wherein the mobile phone communication interface is used for transmitting and receiving signals coming from and/or going to the infrared camera, and the signals comprise control command signals, sound data signals and image data signals, and
- wherein the display screen is for displaying image and data information generated by the image analysis and treatment module.

2. The system for controlling the infrared camera by using the mobile phone according to claim 1, wherein the infrared camera comprises a built-in platform and the camera head, and wherein the built-in platform includes thereon:
- a control module for receiving and identifying the control commands coming from the mobile phone and for transforming the control commands into operation commands respectively corresponding to action controlling, image intercepting, and sound recording and playing;
- an image interception and buffer module for intercepting, buffering and transmitting the infrared image videos captured by the camera head;
- a sound reading and writing module for receiving and recording the sound data coming from the mobile phone, and transmitting the sound data generated by the infrared camera to the mobile phone; and
- a camera communication interface for transmitting and receiving the signals coming from and/or going to the mobile phone, wherein the signals comprise the control command signals, the sound data signals and the image data signals.

3. A system for controlling an infrared camera using a mobile phone, the system comprising:
- a client; and
- an infrared camera used as a server and connected to the client through a communication network, wherein the infrared camera is mounted in a location where infrared measuring and/or monitoring is performed, so as to provide infrared image videos of a monitored object and temperature data of the points contained in an infrared image,
- wherein the client is located remotely from the location of the infrared camera to provide a remote control for the infrared camera,
- wherein the client is the mobile phone comprising a display screen, and the remote control for the infrared camera comprises:
  - controlling movement orientations, oblique angles, rotation angles and image capture actions of a camera head in the infrared camera;
  - intercepting and transmitting the infrared image videos captured by the infrared camera, and displaying an obtained result on the display screen of the mobile phone; and
  - transmitting a sound information coming from the mobile phone to the infrared camera to record and/or play, and transmitting the sound information coming from the infrared camera to the mobile phone to record and/or play,
- wherein the infrared camera comprises a built-in platform and a camera head, and wherein the built-in platform includes:
  - a control module for receiving and identifying control commands coming from the mobile phone and for transforming the control commands into operation commands respectively corresponding to action controlling, image intercepting, and sound recording and playing;
  - an image interception and buffer module for intercepting, buffering and transmitting infrared image videos captured by the camera head;
  - a sound reading and writing module for receiving and recording sound data coming from the mobile phone, and transmitting the sound data generated by the infrared camera to the mobile phone; and
  - a camera communication interface for transmitting and receiving signals coming from and/or going to the mobile phone, wherein the signals comprise control command signals, sound data signals and image data signals.

4. The system for controlling the infrared camera by using the mobile phone according to claim 3, wherein the mobile phone comprises:

a keyboard for generating and transmitting the control commands;

an image analysis and treatment module for receiving infrared image data signals sent from the infrared camera, and extracting temperature information and forming an image browser;

a sound record and play module for sending real-time sound data generated by the mobile phone or stored sound data to the infrared camera, and receiving, recording and/or playing sound data coming from the infrared camera; and a mobile phone communication interface connected respectively with the keyboard, the image analysis and treatment module and the sound record and play module, wherein the mobile phone communication interface is used for transmitting and receiving the signals coming from and/or going to the infrared camera, and the signals comprise the control command signals, the sound data signals and the image data signals; and wherein the display screen is for displaying image and data information generated by the image analysis and treatment module.

* * * * *